United States Patent
Iida

(10) Patent No.: US 9,831,696 B2
(45) Date of Patent: Nov. 28, 2017

(54) POWER SUPPLY CONTROLLER AND METHOD FOR CONTROLLING POWER SUPPLY

(71) Applicant: FUJITSU LIMITED, Kawasaki-shi, Kanagawa (JP)

(72) Inventor: Satoshi Iida, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 20 days.

(21) Appl. No.: 14/983,475

(22) Filed: Dec. 29, 2015

(65) Prior Publication Data
US 2016/0291675 A1 Oct. 6, 2016

(30) Foreign Application Priority Data
Mar. 30, 2015 (JP) .................. 2015-069864

(51) Int. Cl.
- H02J 7/00 (2006.01)
- G06F 1/26 (2006.01)
- G06F 1/32 (2006.01)

(52) U.S. Cl.
CPC ............ *H02J 7/0047* (2013.01); *G06F 1/263* (2013.01); *G06F 1/3234* (2013.01); *G06F 1/3243* (2013.01); *H02J 7/0021* (2013.01); *H02J 7/0054* (2013.01); *H02J 2007/005* (2013.01); *H02J 2007/0067* (2013.01)

(58) Field of Classification Search
CPC ...... H02J 7/0047; H02J 7/0021; H02J 7/0054; G06F 1/263; G06F 1/3234; G06F 1/3243
See application file for complete search history.

(56) References Cited

U.S. PATENT DOCUMENTS

| 6,031,356 A | 2/2000 | Harada et al. |
| 2011/0260689 A1* | 10/2011 | Kano ........... H02J 7/0022 320/128 |
| 2014/0304542 A1* | 10/2014 | Rogers ........... G06F 1/28 713/340 |

FOREIGN PATENT DOCUMENTS

| JP | 11-103532 | 4/1999 |
| JP | 2005-295683 | 10/2005 |

* cited by examiner

*Primary Examiner* — Stefan Stoynov
(74) *Attorney, Agent, or Firm* — Fujitsu Patent Center

(57) ABSTRACT

A power supply controller includes: a processor configured to control a power supply of an information processing apparatus having a plurality of batteries, wherein the processor determines residual capacities of the plurality of batteries and preferentially charges a first battery of the plurality of batteries, the first battery having a residual capacity which is equal to or below a transition-allowable residual capacity that allows a transition of the information processing apparatus from a first mode to a second mode.

11 Claims, 8 Drawing Sheets

POWER SUPPLY CONTROLLER AND METHOD FOR CONTROLLING POWER SUPPLY

CROSS-REFERENCE TO RELATED APPLICATION

This application is based upon and claims the benefit of priority from the prior Japanese Patent Application No. 2015-069864, filed on Mar. 30, 2015, the entire contents of which are incorporated herein by reference.

FIELD

The embodiments discussed herein are related to a power supply controller and a method for controlling a power supply.

BACKGROUND

An electronic equipment has an internal battery (e.g., a built-in battery) and an additional battery.

Related techniques are disclosed in, for example, Japanese Laid-Open Patent Publication No. 11-103532.

SUMMARY

According to an aspect of the embodiments, a power supply controller includes: a processor configured to control a power supply of an information processing apparatus having a plurality of batteries, wherein the processor determines residual capacities of the plurality of batteries and preferentially charges a first battery of the plurality of batteries, the first battery having a residual capacity which is equal to or below a transition-allowable residual capacity that allows a transition of the information processing apparatus from a first mode to a second mode.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
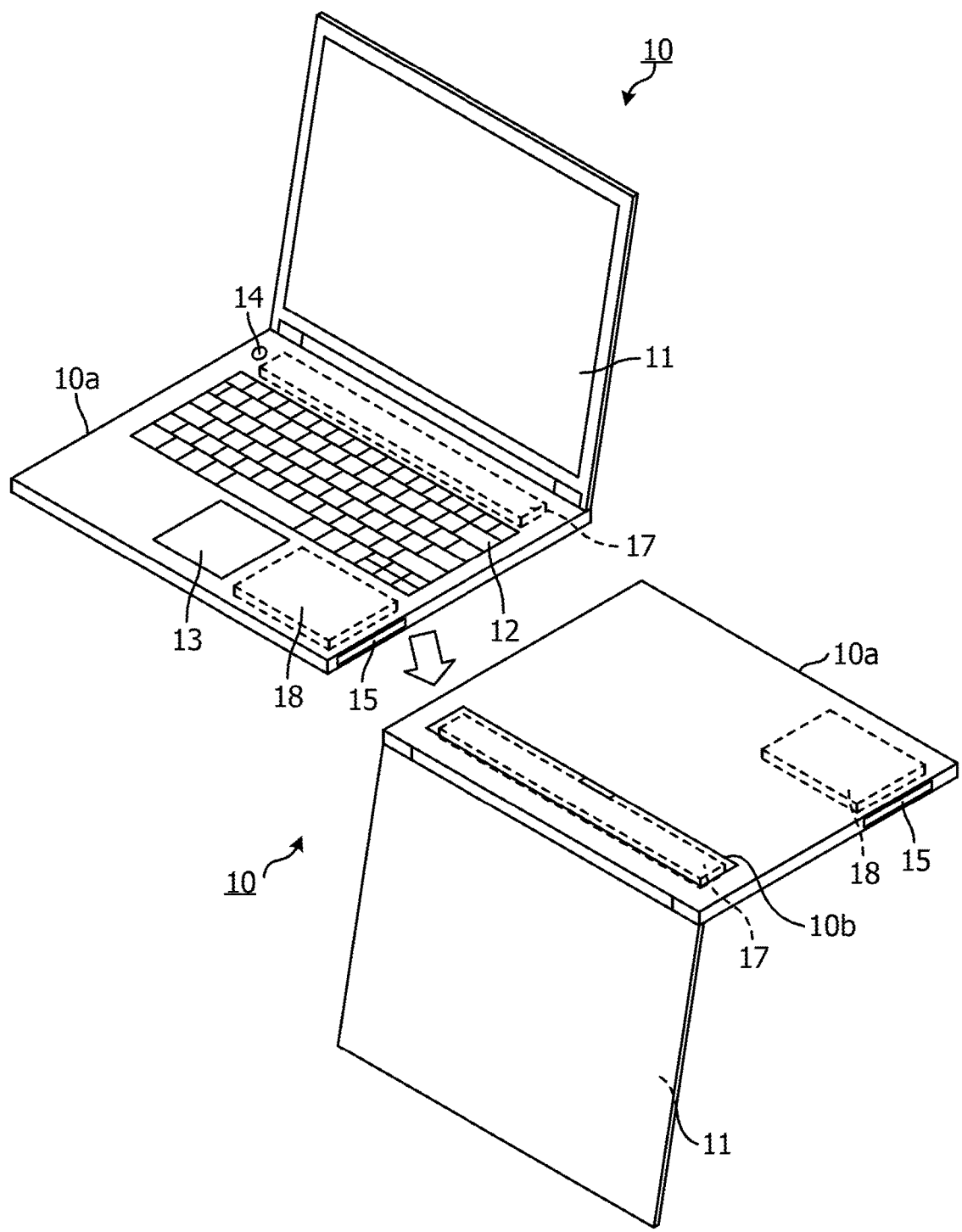
FIG. 1 illustrates an example of a PC.

In an electronic equipment having an internal battery (e.g., a built-in battery) and an additional battery, the internal battery is charged first before the additional battery is charged.

For example, when the internal battery is preferentially charged, it may be difficult to make a transition of the electronic equipment from a sleep mode of S3 (hereinafter also referred to as an "S3 mode") to a pause mode of S4 (hereinafter also referred to as an "S4 mode") depending on the residual capacity of the additional battery. For example, if the residual capacity of the additional battery is equal to or less than a capacity allowing the electronic equipment to be transitioned from the S3 mode to the S4 mode, and the internal battery is removed from the electronic equipment before the additional battery is charged, the transition from the S3 mode to the S4 mode may be unsuccessful, thereby resulting in a damage of data stored in a memory.

Throughout the specification and the drawings, elements having substantially the same or similar function or configuration are denoted by the same reference numerals and explanation thereof may not be repeated.

FIG. 1 illustrates an example of a personal computer (PC). For example, a PC 10 illustrated in FIG. 1 is a notebook PC including a housing 10a internally equipped therein with a CPU, a memory or the like and a display 11 for displaying images.

The housing 10a includes a keyboard 12, a touch pad 13, a power button 14 to turn ON the PC 10, and a loading port 15 in which a Compact Disc (CD) or a Digital Versatile Disk (DVD) is loaded. The keyboard 12 and the touch pad 13 are used for an input operation of a user, for example, an input of any commands or instructions into the PC 10 by the user. A CPU, chip sets and so on are arranged under the keyboard 12.

The PC 10 is equipped with two batteries including an internal battery 17 and an additional battery 18. The internal battery 17 is a battery built in the PC 10 at the time of a shipment. The additional battery 18 is a battery mounted in the PC 10 after a shipment.

On the rear surface of the housing 10a of FIG. 1, there is formed a cover 10b through which the internal battery 17 can be removed. For example, the internal battery 17 may be removed when the internal battery 17 is to be rapidly charged with a charger or when the internal battery 17 is to be replaced with a new one. For example, the additional battery 18 may be removed from the loading port 15, and in the PC 10, the internal battery 17 and the additional battery 18 may be removed from the housing 10a.

The PC 10 of FIG. 1 may be an example of an information processing apparatus having a plurality of batteries. Another example of the information processing apparatus may include an electronic equipment such as a desktop PC or a tablet type electronic equipment having a plurality of batteries. The internal battery 17 and the additional battery 18 may be an example of the plurality of batteries installed in the information processing apparatus. The plurality of batteries installed in the information processing apparatus may be two or more internal batteries or two or more additional batteries, or a combination of two or more internal batteries and additional batteries.

Figure 2:
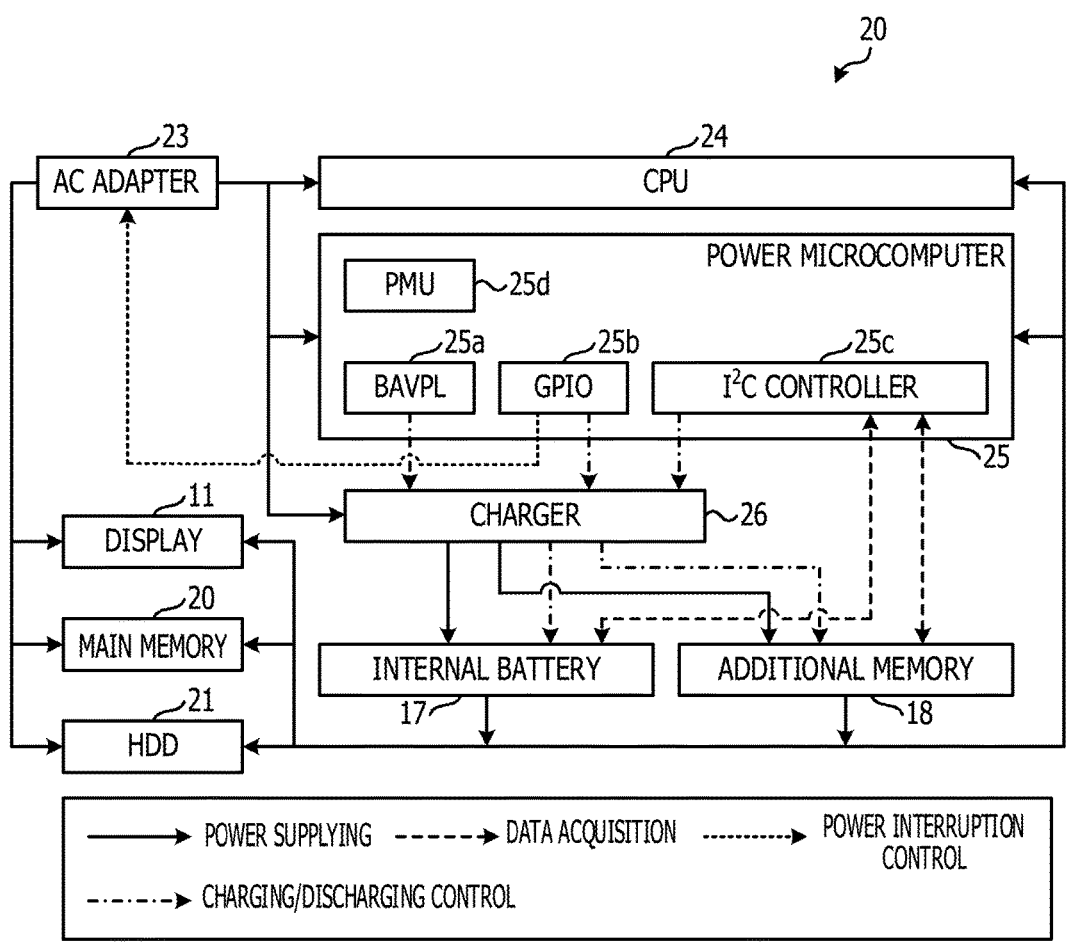
FIG. 2 illustrates an example of a hardware configuration of the PC.

FIG. 2 illustrates an example of the hardware configuration of the PC. The PC 10 includes a display 11, an internal battery 17, an additional battery 18, a main memory 20, a Hard Disk Drive (HDD) 21, an AC adapter 23, a Central Processing Unit (CPU) 24, a power microcomputer 25, and a charger 26.

The AC adapter 23 supplies power from an AC line to the CPU 24, the power microcomputer 25, the charger 26, and the like. The AC adapter 23 blocks the supply of power from the AC line based on an output signal from a GPIO 25b of the power microcomputer 25. The AC adapter 23 supplies the charger 26 with a current for charging the internal battery 17 and the additional battery 18.

The charger 26 is a circuit for controlling the charging/discharging of the internal battery 17 and the additional battery 18. When the supply of power from the AC line is stopped, the charger 26 controls the discharging from the internal battery 17 and the additional battery 18, and supplies power to each of various components of the PC 10. When the internal battery 17 and the additional battery 18 are not fully charged while the power is being supplied from the AC line, the charger 26 controls the charging of each battery.

The CPU 24 controls the overall operation of the PC 10. For example, for a given event, the CPU 24 makes a transition of the PC 10 from an operation mode of S0 (hereinafter also referred to as an "S0 mode") to the S4 mode under the control of operating system (OS). When the state of the PC 10 proceeds to the S4 mode, the data and so on of applications under the execution are stored from the main memory 20 to the HDD 21. As a result, when the power button 14 of the PC 10 is then pressed to turn ON the PC 10, the data and so on of the applications under the execution are acquired from the HDD 21 for a re-execution of the applications.

The power microcomputer 25 monitors the residual capacities of the internal battery 17 and the additional battery 18. The power microcomputer 25 includes a battery arbiter (BAVLP) 25a, a General Purpose Input/Output (GPIO) 25b, an Inter-Integrated Circuit ($I^2C$) controller 25c and a Power Management Unit (PMU) 25d.

The battery arbiter 25a has an arbitration function for achieving an increase in battery duration. The GPIO 25b may be an interface for coupling the power microcomputer 25 with the charger 26 and the AC adapter 23.

The $I^2C$ controller 25c outputs a signal of $I^2C$ and performs a data communication by a serial bus and a control of the charging/discharging. The PMU 25d performs a power management of the PC 10. Based on the residual capacities of the internal battery 17 and the additional battery 18, the PMU 25d performs a control as to which of the internal battery 17 or the additional battery 18 is to be first charged or discharged. For a given event, the PMU 25d controls an automatic transition from the S3 mode to the S0 mode. The power microcomputer 25 may be an example of a power controller for performing a power control of the information processing apparatus having plurality of batteries.

The S0 mode corresponds to a state in which all of the power supplies of the PC 10 is turned ON. The S3 mode corresponds to a state in which only the main battery 20 in the PC 10 is turned ON with the others turned OFF. The S4 mode corresponds to a state in which all of the power supplies of the PC 10 to be saved are turned OFF (e.g., in hibernation). In the S4 mode, after the data in the main memory 20 are saved in the HDD 21, all of the power supplies of the PC 10 are turned OFF. For example, the modes S0, S3 and S4 may be one of definitions for system energy-saving states by the Advanced Power & Configuration Interface (ACPI) which is the standard of an OS-based PC of Windows®.

When the supply of power from the AC adapter 23 is stopped and the PC 10 is driven by a discharging current from the internal battery 17 or the additional battery 18, the residual capacity of the internal battery 17 or the additional battery 18 is being decreased during the S3 mode.

In this case, when an average of the residual capacities of the internal battery 17 and the additional battery 18 becomes lower than a certain threshold of the Design Capacity of Low (DCL), the power microcomputer 25 makes a transition of the PC 10 from the sleep mode of S3 to the operation mode of S0 in order to protect the data. When there is an automatic transition of the PC 10 to the S0 mode, the CPU 24 saves the data of the main memory 20 in the HDD 21 under the control of the OS and makes a transition from the S0 mode to the S4 mode. Thus, an automatic transition of the PC 10 from the S3 mode to the S4 mode is realized.

For example, the threshold DCL is set to a value twice the residual battery capacity of allowing the transition of the PC 10 from the S3 mode to the S4 mode. For example, DCL/2 indicates the lower limit of the residual battery capacity of allowing an automatic transition of the PC 10 from the S3 mode to the S4 mode. When the residual battery capacity is below the threshold DCL, the power microcomputer 25 performs a process of the above-described automatic transition of the PC 10 from the S3 mode to the S4 mode.

In the PC 10 equipped with two batteries, the power microcomputer 25 calculates an average of the residual capacities of the two batteries as a residual battery capacity and compares the calculated average value with the threshold DCL. For example, the power microcomputer 25 may monitor the residual capacities of the internal battery 17 and the additional battery 18 at an interval of ten minutes.

Figure 3A:
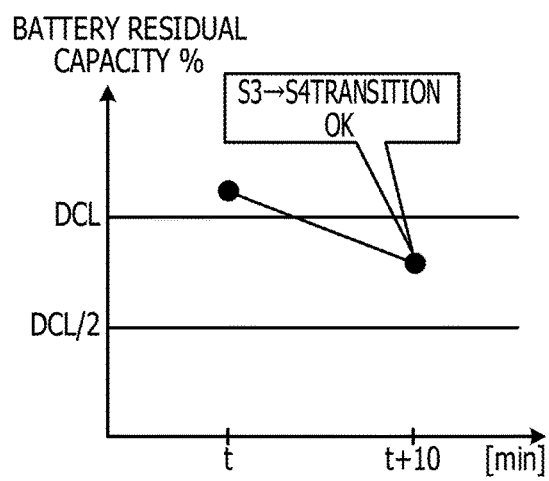
FIGS. 3A and 3B illustrate an example of the relationship between the residual battery capacity of the PC and the transition from the S3 mode to the S4 mode.
Figure 3B:
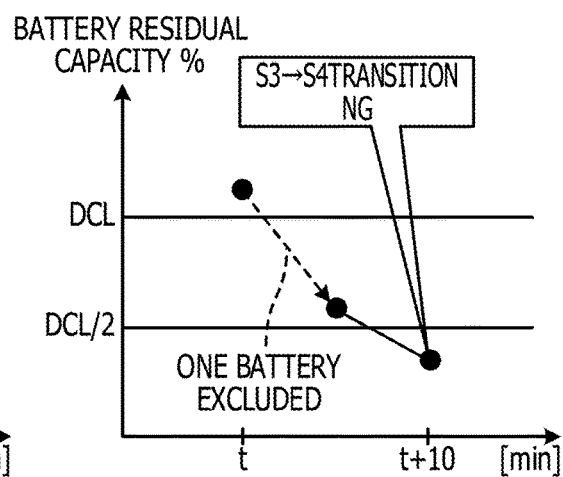

FIGS. 3A and 3B illustrate an example of the relationship between the residual battery capacity of the PC and a transition from the S3 mode to the S4 mode. For example, as illustrated in FIG. 3A, the power microcomputer 25 may determine that an average of the residual capacities of the internal battery 17 and the additional battery 18 monitored previously, e.g., at time t, is equal to or more than the DCL and an average of the residual capacities of the both batteries monitored currently, e.g., ten minutes after time t, is below DCL. In this case, an automatic transition from the S3 mode to the S0 mode is performed by the power microcomputer 25. After the transition to the S0 mode, the data are saved in the HDD 21 under the control of the OS and the automatic transition from the S0 mode to the S4 mode is performed. Thus, when the average value of the monitored residual capacities of the internal battery 17 and the additional battery 18 is equal to or below DCL, the PC 10 may make an automatic transition from the S3 mode to the S4 mode.

For example, even when the average of the residual capacities of both batteries monitored previously is equal to or more than the DCL, if the average of the residual capacities of both batteries monitored currently is below the residual capacity that allows the transition from the S3 mode to the S4 mode, the transition from the S3 mode to the S4 mode may be unsuccessful. In this case, the data of applications under the execution may be corrupted without being saved in the HDD 21. The power microcomputer 25 may monitor the residual capacities of the batteries at an interval of ten minutes in the S3 mode. Therefore, if the batteries being used are under deterioration or if one battery is excluded during the S3 mode as illustrated in FIG. 3B, the other battery may be below the residual capacity that allows the transition from the S3 mode to the S4 mode, and, therefore, the PC 10 may be prevented from transitioning from the S3 mode to the S4 mode.

For example, in some control methods, the internal battery 17 is preferentially charged at the time of charging irrespective of the quantity of residual capacity of the additional battery 18. In this control method, there may be a situation where the residual capacity of the additional battery 18 falls below the residual capacity that allows the transition from the S3 mode to the S4 mode. In this situation, when the internal battery 17 is removed during the S3 mode, the automatic transition from the S3 mode to the S4 mode may be unsuccessful.

For example, in some control methods, at the time of discharging, in case of serial discharging in which the internal battery 17 and the additional battery 18 are discharged in sequence, the internal battery 17 is discharged until the residual capacity of the additional battery 17 reaches 0%, and then, the internal battery 17 is switched to allow a discharge from the additional battery 18. For example, in this control method, if the internal battery 17 is removed during the S3 mode under a situation where the residual capacity of the additional battery 18 falls below the residual capacity that allows the transition from the S3 mode to the S4 mode, the automatic transition from the S3 mode to the S4 mode may be unsuccessful. At the time of both of charging and discharging, if the automatic transition from the S3 mode to the S4 mode is unsuccessful, the data may be corrupted without being saved in the HDD 21.

The case where the internal battery 17 or the additional battery 18 is removed during the S3 mode includes a battery exchange, a rapid charging by a separate charger and the like. In this case, it can be readily assumed that the internal battery 17 is removed in the same way as the additional battery 18.

In the power microcomputer 25, the failure of the automatic transition from the S3 mode to the S4 mode may be reduced. In addition, it is possible to perform a charging/discharging control such as preventing the residual battery capacity from being below the residual capacity allowing the transition from the S3 mode to the S4 mode during the S3 mode.

Figure 4:
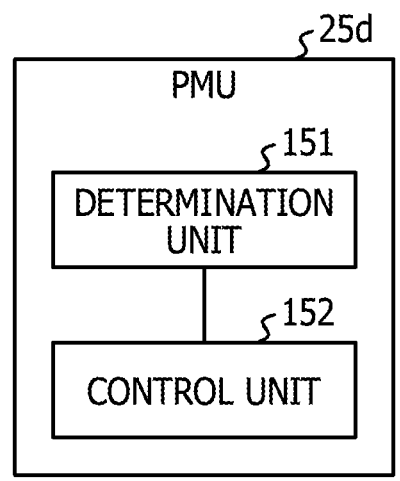
FIG. 4 illustrates an example of a functional configuration of PMU.

FIG. 4 illustrates an example of the functional configuration of the PMU. The PMU 25d includes a determination unit 151 and a control unit 152. The determination unit 151 monitors the residual capacities of the internal battery 17 and the additional battery 18.

In the PC 10 having the two batteries, at the time of charging, the control unit 152 performs a control such as preferentially charging one battery whose residual capacity is equal to or below the residual capacity that allows the transition from the S3 mode to the S4 mode. In addition, the control unit 152 performs a control such as preferentially charging the internal battery when the residual capacities of both batteries are equal to or below the residual capacity that allows the transition from the S3 mode to the S4 mode.

In the PC 10 having the two batteries, at the time of serial discharging, the control unit 152 preferentially discharges from a battery whose residual capacity is above the residual capacity that allows the transition from the S3 mode to the S4 mode. However, the control unit 152 preferentially discharges from the additional battery when the residual capacities of both batteries are above the residual capacity that allows the transition from the S3 mode to the S4 mode. The control unit 152 switches the discharging from the additional battery 18 to the discharging from the internal battery 17 before the residual capacity of the additional battery 18 which starts discharging earlier becomes equal to or below the residual capacity allowing the transition from the S3 mode to the S4 mode.

Figure 5:
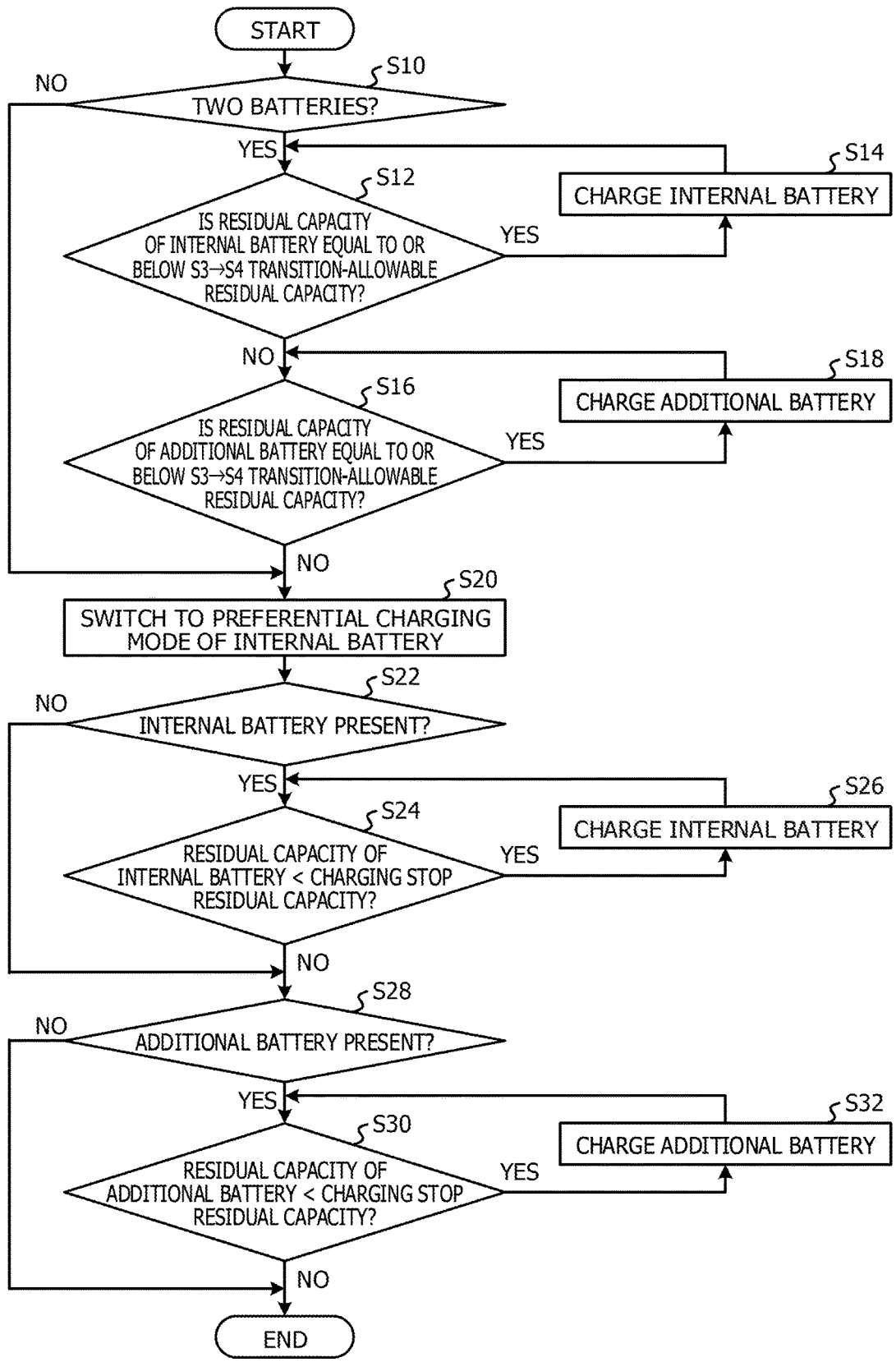
FIG. 5 is a flowchart of an example of a charging control process.
Figure 6A:
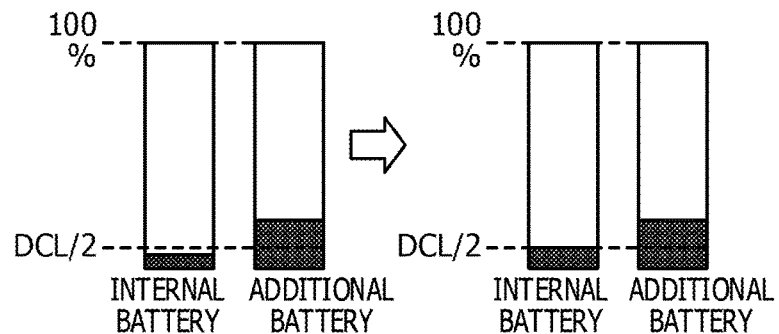
FIGS. 6A to 6C illustrate an example of the charging control process.
Figure 6B:
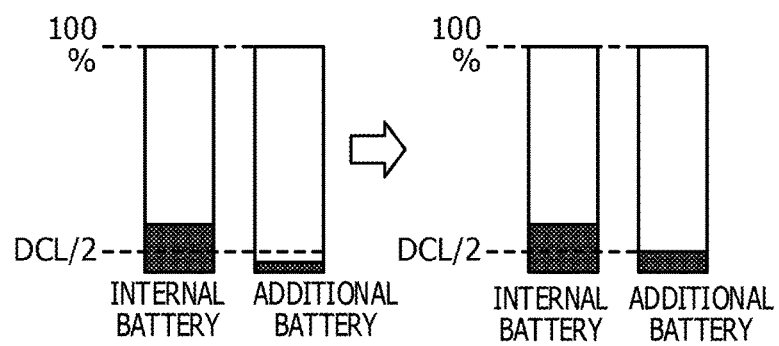
Figure 6C:
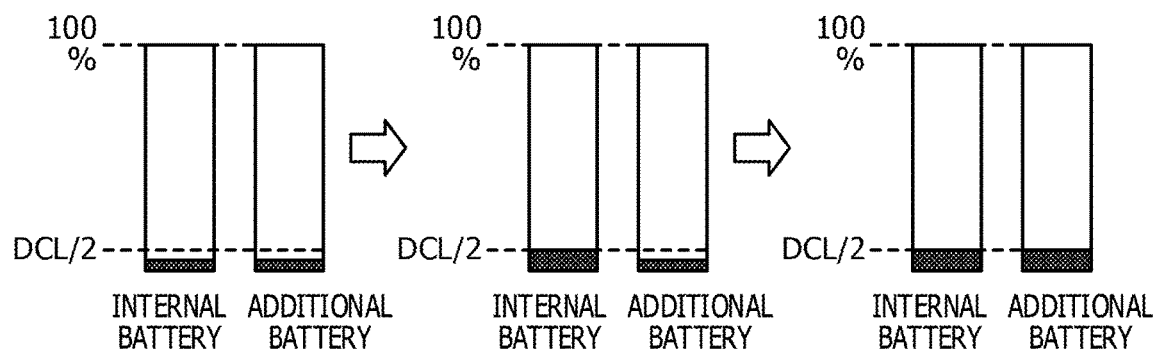

FIG. 5 is a flowchart of an example of a charging control process. The process illustrated in FIG. 5 may be performed, for example, by the power microcomputer 25 illustrated in FIG. 2. FIGS. 6A to 6C are views for explaining an example of the charging control process. FIG. 6A illustrates a case where the residual capacity of the internal battery 17 reaches DCL/2. FIG. 6B illustrates a case where the residual capacity of the additional battery 18 reaches DCL/2. FIG. 6C illustrates a case where the internal battery 17 is preferentially charged.

A value of DCL/2 is set with the lower limit of the residual capacity that allows the transition from the S3 mode to the S4 mode. For example, if DCL is set to 5% of the full battery charging, the residual capacity that allows the transition from the S3 mode to the S4 mode may be set to 3% of the full battery charging. If an average of the residual capacities of the two batteries is below the threshold DCL, an automatic transition from the S3 mode to the S4 may be performed. Without being limited to DCL, any value within a range from DCL/2 to DCL may be set as a value to be used as the threshold to determine whether or not to perform the automatic transition. An error handling for abnormal conditions of the internal battery 17, the additional battery 18, and the charger 25 may be added to the charging control process illustrated in FIG. 5.

In the charging control process illustrated in FIG. 5, the determination unit 151 determines whether or not the PC 10 is equipped with two batteries (Operation S10). If the determination unit 151 determines that the PC 10 is not equipped with two batteries, the process proceeds to Operation S20.

If it is determined that the PC 10 is equipped with two batteries, the determination unit 151 determines whether or not the residual capacity of the internal battery 17 is equal to or below the residual capacity that allows the transition from the S3 mode to the S4 mode (Operation S12). If the determination unit 151 determines that the residual capacity of the internal battery 17 is equal to or below the residual capacity that allows the transition from the S3 mode to the S4 mode, the control unit 152 charges the internal battery 17 (Operation S14). For example, as illustrated in FIG. 6A, Operation S12 and Operation S14 are repeated until the residual capacity of the internal battery 17 reaches DCL/2. If it is determined that the residual capacity of the internal battery 17 reaches DCL/2, the process proceeds to Operation S16.

The determination unit 151 determines whether or not the residual capacity of the additional battery 18 is below the residual capacity that allows the transition from the S3 mode to the S4 mode (Operation S16). If the determination unit 151 determines that the residual capacity of the additional battery 18 is equal to or below the residual capacity that allows the transition from the S3 mode to the S4 mode, the control unit 152 charges the additional battery 18 (Operation S18). For example, as illustrated in FIG. 6B, Operation S16 and Operation S18 are repeated until the residual capacity of the additional battery 18 reaches DCL/2. If it is determined that the residual capacity of the additional battery 18 reaches DCL/2, the process proceeds to Operation S20.

In Operations S10 to S18, if both residual capacities of the internal battery 17 and the additional battery 18 are equal to or below the residual capacity that allows the transition from the S3 mode to the S4 mode, the internal battery 17 is preferentially charged as illustrated in FIG. 6C. For example, Operation S12 and Operation S14 are repeated until the residual capacity of the internal battery 17 reaches DCL/2. Operation S16 and Operation S18 are repeated until the residual capacity of the additional battery 18 reaches DCL/2 after the residual capacity of the internal battery 17 reaches DCL/2.

In this way, when both residual capacities of the internal battery 17 and the additional battery 18 are above the residual capacity that allows the transition from the S3 mode to the S4 mode, a switching to a charging mode in which the internal battery 17 is charged earlier than the additional battery 18 is performed in Operation S20 of FIG. 5.

The determination unit 151 determines whether or not the PC 10 is equipped with the internal battery 17 (Operation S22). If the determination unit 151 determines that the PC 10 is not equipped with the internal battery 17 because, for example, the internal battery 17 is removed, the process proceeds to Operation S28. If the determination unit 151 determines that the PC 10 is equipped with the internal battery 17, the determination unit 151 determines whether or not the residual capacity of the internal battery 17 is below a charging stop residual capacity (Operation S24). The charging stop residual capacity may be set in advance. For example, for an 80% charging mode, the charging stop residual capacity corresponds to 80% of the maximum chargeable amount, and the power microcomputer 25 stops the charging when the battery is charged up to 80% of the maximum chargeable amount.

If the determination unit 151 determines that the residual capacity of the internal battery 17 is below the charging stop residual capacity, the determination unit 151 performs the charging of the internal battery 17 (Operation S26). If the determination unit 151 determines that the residual capacity of the internal battery 17 is above the charging stop residual capacity, the process proceeds to Operation S28.

In Operation S28, the determination unit 151 determines whether or not the PC 10 is equipped with the additional battery 18. If it is determined that the PC 10 is not equipped with the additional battery 18, the process is ended. If it is determined that the PC 10 is equipped with the additional battery 18, the determination unit 151 determines whether or not the residual capacity of the additional battery 18 is below the charging stop residual capacity (Operation S30). If the determination unit 151 determines that the residual capacity of the additional battery 18 is below the charging stop residual capacity, the determination unit 151 performs the charging of the additional battery 18 (Operation S32). If the determination unit 151 determines that the residual capacity of the additional battery 18 is above the charging stop residual capacity, the process is ended.

The above-described battery charging control is performed as follows.

(1) If the residual capacity of the internal battery 17 is equal to or below the residual capacity (=DCL/2) that allows the transition from the S3 mode to the S4 mode, the internal battery 17 is charged in preference to the additional battery 18.

(2) If the residual capacity of the additional battery 18 is equal to or below the residual capacity that allows the transition from the S3 mode to the S4 mode and the residual capacity of the internal battery 17 is above the residual capacity that allows the transition from the S3 mode to the S4 mode, the additional battery 18 is charged in preference to the internal battery 17.

(3) If the residual capacities of both batteries are equal to or below the residual capacity that allows the transition from the S3 mode to the S4 mode, the internal battery 17 and the additional battery 18 are charged in this order until the residual capacities of both batteries reach the residual capacity that allows the transition from the S3 mode to the S4 mode.

After the residual capacities of both batteries reach the residual capacity that allows the transition from the S3 mode to the S4 mode, the internal battery 17 is preferentially charged.

In the power microcomputer 25, as the above-described charging control is performed when the PC 10 is equipped with two or more batteries, it is possible to reduce a data corruption resulting from the failure of the transition from the S3 mode to the S4 mode.

Figure 7:
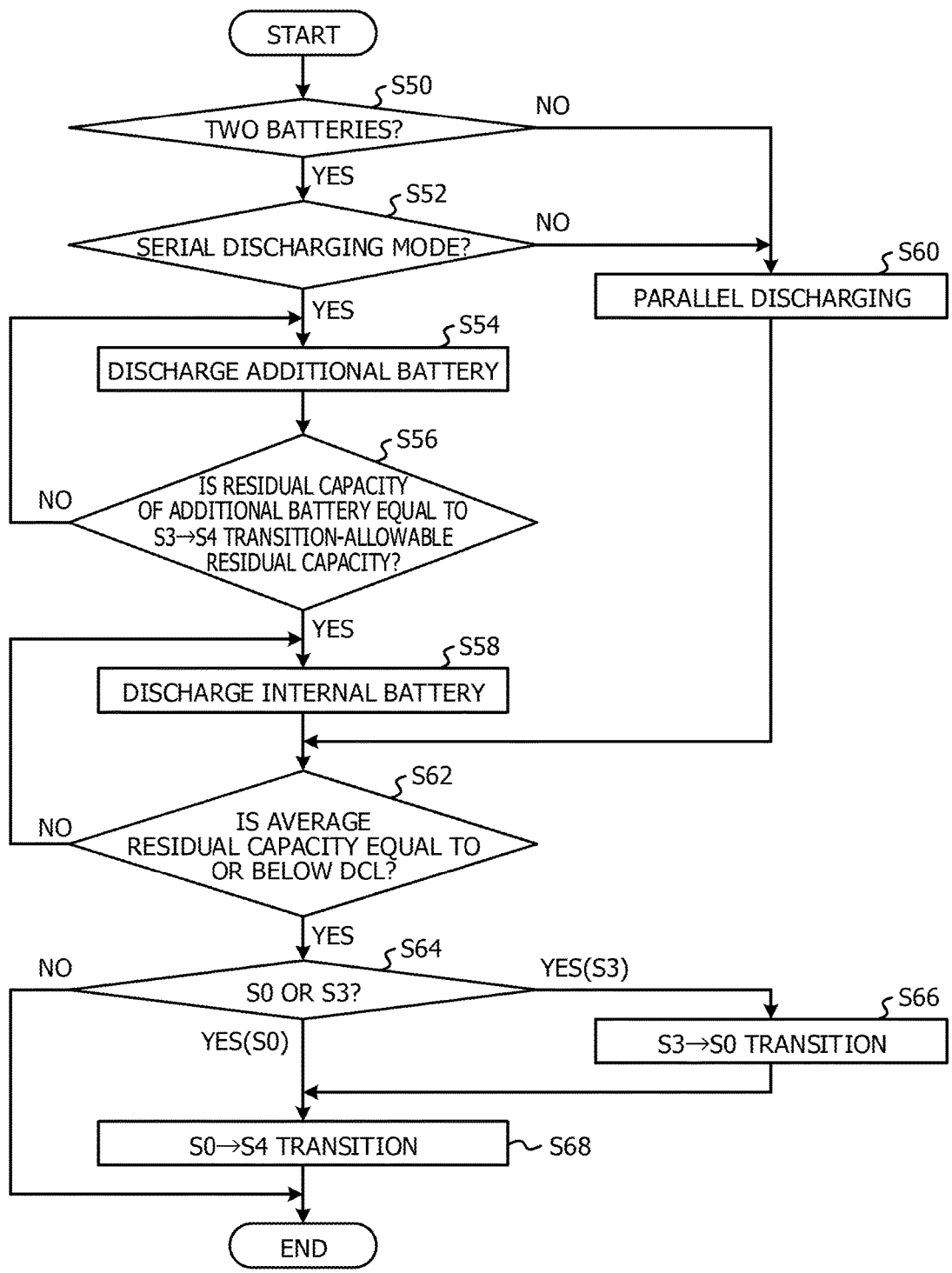
FIG. 7 illustrates an example of a discharging control process.
Figure 8:
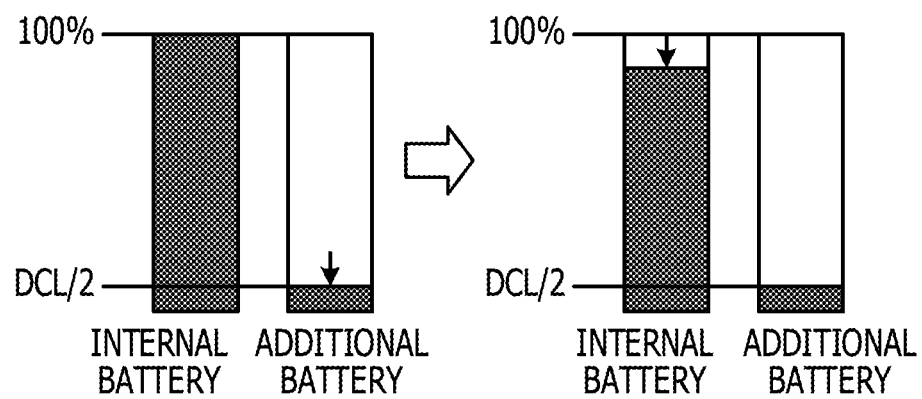
FIG. 8 illustrates an example of the discharging control process.

FIG. 7 is a flowchart of an example of a discharging control process and FIG. 8 is a view for explaining an example of the discharging control process. The process illustrated in FIG. 7 may be performed, for example, by the power microcomputer 25 illustrated in FIG. 2.

A DCL value setting, an error handling for battery abnormal conditions and the like may be added to the discharging control process illustrated in FIG. 7 in the same way as the charging control process illustrated in FIG. 5.

The determination unit 151 determines whether or not the PC 10 is equipped with two batteries (Operation S50). If the determination unit 151 determines that the PC 10 is not equipped with two batteries, the control unit 152 performs a control of a parallel discharging (Operation S60) and then, the process proceeds to Operation S62. In the parallel discharging, both of the internal battery 17 and the additional battery 18 are discharged in parallel. In a serial discharging, the internal battery 17 and the additional battery 18 are sequentially discharged.

If it is determined that the PC 10 is equipped with two batteries, the determination unit 151 determines whether or not the PC 10 is in a serial discharging mode (Operation S52). If it is determined that the PC 10 is not in the serial discharging mode, the control unit 152 performs a control of the parallel discharging (Operation S60) and then, the process proceeds to Operation S62.

If it is determined that the PC 10 is in the serial discharging mode, the control unit 152 performs a discharging of the additional battery 18 (Operation S54). Then, the determination unit 151 determines whether or not the residual capacity of the additional battery 18 is equal to the residual capacity that allows the transition from the S3 mode to the S4 mode (Operation S56). The control unit 152 discharges the additional battery 18 until the residual capacity of the additional battery 18 reaches the residual capacity that allows the transition from the S3 mode to the S4 mode. When the determination unit 151 determines that the residual capacity of the additional battery 18 is equal to the residual capacity that allows the transition from the S3 mode to the S4 mode, the control unit 152 discharges the internal battery 17 (Operation S58).

As illustrated in FIG. 8, the additional battery 18 is discharged until the residual capacity of the additional battery 18 reaches DCL/2, and the internal battery 17 is discharged after the residual capacity of the additional battery 18 reaches DCL/2. In FIG. 7, the determination unit 151 determines whether or not an average of the residual capacities of the internal battery 17 and the additional battery 18 is equal to or below DCL (Operation S62), and discharges the internal battery 17 until the average of the residual capacities of both batteries is equal to or below DCL. If it is determined that the average of the residual capacities of both batteries is below DCL, the determination unit 151 determines whether the PC 10 is in the S0 mode or in the S3 mode (Operation S64). If the determination unit 151 determines that the PC 10 is neither in the S0 mode nor in the S3 mode, the process is ended.

If the determination unit 151 determines that the PC 10 is in the S3 mode, the control unit 152 makes a transition of the PC 10 from the S3 mode to the S0 mode (Operation S66). Then, the state of the PC 10 proceeds from the sleep state to the operation state.

If the determination unit 151 determines in Operation S64 that a state of the PC 10 is in the S0 mode or if the transition from the S3 mode to the S0 mode is performed in Operation S66, the CPU 24 transitions the PC 10 from the S0 mode to the S4 mode under control of OS (Operation S68) and then the process is ended. Thus, the state of the PC 10 proceeds from the operation state to the pause state. When the state of the PC 10 proceeds from the S0 mode to the S4 mode, the data in the main memory 20 are saved in the HDD 21. As a result, the PC 10 may acquire the data from the HDD 21 when the power button 14 of the PC 10 is pressed next to turn ON the PC 10.

In the above-described battery discharging control, in the case of the serial discharging, when the residual capacity of the additional battery 18 is equal to the residual capacity that allows the transition from the S3 mode to the S4 mode, the PC 10 is switched to discharge from the internal battery 17. When the average of the residual capacities of the internal battery 17 and the additional battery 18 is equal to or below DCL, the PC 10 in the S0 mode or the S3 mode makes an automatic transition to the S4 mode.

The power microcomputer 25 performs the above-described discharging control when the PC 10 is equipped with two or more batteries. This may reduce data corruption due to the failure of the transition from the S3 mode to the S4 mode.

For example, for the PC 10 equipped with two or more batteries, in a control method of preferentially charging the internal battery irrespective of its residual capacity, the PC 10 is switched to charging the additional battery when the internal battery is charged up to the charging stop residual capacity.

For example, for the PC 10 equipped with two or more batteries, in the case of serial discharging, the additional battery which has been discharging first is discharged up to 0% of its residual capacity and, then, the discharge is switched to the internal battery.

For example, for the PC 10 equipped with two or more batteries, when the residual capacity of one battery is equal to or below the residual capacity that allows the transition from the S3 mode to the S4 mode, the battery whose residual capacity is equal to or below the residual capacity that allows the transition from the S3 mode to the S4 mode is preferentially charged. If the residual capacities of both batteries are equal to or below the residual capacity that allows the transition from the S3 mode to the S4 mode, the internal battery is preferentially charged.

For example, for the PC 10 equipped with two or more batteries, in the case of serial discharging, the discharge is switched to the internal battery before the residual capacity of the additional battery falls below the residual capacity that allows the transition from the S3 mode to the S4 mode. If the residual capacities of both batteries are equal to or above the residual capacity that allows the transition from the S3 mode to the S4 mode, the additional battery is preferentially charged.

For example, for the PC 10 equipped with two or more batteries, the cases where the residual capacity of one battery is below the residual capacity that allows the transition from the S3 mode to the S4 mode are reduced and a failure of the automatic transition from the S3 mode to the S4 mode is reduced. A data corruption caused by the failure of the transition from the S3 mode to the S4 mode may also be reduced. The configuration of the PC 10 may be an example of the information processing apparatus. The number of batteries included in the information processing apparatus is not limited to two but may be three or more. The batteries included in the information processing apparatus may include two or more internal batteries and two or more additional batteries.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A power supply controller to control a power supply of an information processing apparatus having a plurality of batteries, the power supply controller comprising:
   a processor configured to determine residual capacities of the plurality of batteries,
   preferentially charge a first battery of the plurality of batteries when the first battery having a residual capacity which is equal to or below a transition-allowable residual capacity that allows a transition of the information processing apparatus from a first mode to a second mode,
   when the plurality of batteries include an internal battery built in the information processing apparatus during a manufacturing process and an additional battery added to the information processing apparatus after the manufacturing process, charge the internal battery in preference to the additional battery,
   compare an average of residual capacities of the plurality of batteries with a threshold value when the residual capacity of the additional battery is equal to the transition-allowable residual capacity, and
   discharge the internal battery when the average is larger than the threshold value.

2. The power supply controller according to claim 1, wherein the first mode indicates a state where only a power supply of a main memory of the information processing apparatus is turned ON, and the second mode indicates a state where all power supplies of the information processing apparatus is turned OFF.

3. The power supply controller according to claim 1, wherein, if there does not exist the first battery whose residual capacity is equal to or below the transition-allowable residual capacity, an internal battery which is included in the plurality of batteries and is built in the information processing apparatus during a manufacturing process is charged in preference to an additional battery which is included in the plurality of batteries and is added to the information processing apparatus after the manufacturing process.

4. The power supply controller according to claim 1, wherein the processor preferentially discharges a second battery whose residual capacity is above the transition-allowable residual capacity.

5. A power supply controller to control a power supply of an information processing apparatus having a plurality of batteries, comprising:
   a processor configured to determine residual capacities of the plurality of batteries,
   preferentially discharging a first battery of the plurality of batteries when the first battery having a residual capacity which is equal to or above a transition-allowable residual capacity that allows a transition of the information processing apparatus from a first mode to a second mode, when the plurality of batteries include an internal battery built in the information processing apparatus during a manufacturing process and an additional battery added to the information processing apparatus after the manufacturing process, discharging the additional battery preferentially, discharging the internal battery when the residual capacity of the additional battery is equal to or below the transition-allowable residual capacity, comparing an average of residual capacities of the plurality of batteries with a threshold value when the residual capacity of the additional battery is equal to the transition-allowable residual capacity, and changing the mode of the information processing apparatus if the average is smaller than the threshold value.

6. The power supply controller according to claim 5, wherein the first mode indicates a state where only a power supply of a main memory of the information processing apparatus is turned ON, and the second mode indicates a state where all power supplies of the information processing apparatus is turned OFF.

7. A method for controlling a power supply, the method comprising:

determining residual capacities of a plurality of batteries included in the information processing apparatus; and performing, by a computer, a charging control process or a discharging control process for the information processing apparatus based on a result of the determination, wherein the charging control process includes preferentially charging a first battery of the plurality of batteries when the first battery has a residual capacity which is equal to or below a transition-allowable residual capacity that allows a transition of the information processing apparatus from a first mode to a second mode, and wherein the discharging control process includes preferentially discharging a second battery of the plurality of batteries when the second battery has the residual capacity which is equal to or above the transition-allowable residual capacity.

8. The method according to claim 7, further comprising:

determining whether the information processing apparatus is in a serial discharging mode or in a parallel discharging mode; and performing the discharging control process if the information processing apparatus is in the serial discharging mode.

9. The method according to claim 7, wherein the plurality of batteries includes an internal battery built in the information processing apparatus during a manufacturing process and an additional battery added to the information processing apparatus after the manufacturing process.

10. The method according to claim 9, further comprising:

comparing an average of residual capacities of the plurality of batteries with a threshold value when the residual capacity of the additional battery is equal to the transition-allowable residual capacity; and discharging the internal battery if the average is larger than the threshold value.

11. The method according to claim 7, further comprising:

comparing an average of residual capacities of the plurality of batteries with a threshold value when the residual capacity of the second battery is equal to the transition-allowable residual capacity; and changing a mode of the information processing apparatus if the average is smaller than the threshold value.

* * * * *